United States Patent
Myoung

(10) Patent No.: US 8,733,238 B2
(45) Date of Patent: May 27, 2014

(54) EGG SEPARATOR

(75) Inventor: Sul Gi Myoung, Federal Way, WA (US)

(73) Assignee: Progressive International Corporation, Kent, WA (US)

(*) Notice: Subject to any disclaimer, the term of this patent is extended or adjusted under 35 U.S.C. 154(b) by 248 days.

(21) Appl. No.: 13/286,876

(22) Filed: Nov. 1, 2011

(65) Prior Publication Data

US 2012/0125210 A1 May 24, 2012

Related U.S. Application Data

(60) Provisional application No. 61/416,423, filed on Nov. 23, 2010.

(51) Int. Cl.
*A47J 43/14* (2006.01)

(52) U.S. Cl.
USPC ............................................. 99/499; 99/497

(58) Field of Classification Search
USPC .......................................... 99/497, 499, 500
See application file for complete search history.

(56) References Cited

U.S. PATENT DOCUMENTS

| 657,125 | A | * | 9/1900 | Lindsay | 99/499 |
|---|---|---|---|---|---|
| 2,000,472 | A | * | 5/1935 | Muzzio | 99/499 |
| 2,212,328 | A | * | 8/1940 | Scurlock | 99/497 |
| 3,656,525 | A | * | 4/1972 | Goodart | 99/499 |
| D380,354 | S | | 7/1997 | Ferrin | |
| 5,784,953 | A | | 7/1998 | Wang | |
| D413,492 | S | | 9/1999 | Wang | |
| D498,986 | S | | 11/2004 | So | |
| D499,312 | S | | 12/2004 | So | |
| 6,915,735 | B1 | | 7/2005 | So | |
| D555,984 | S | | 11/2007 | Curtin | |

\* cited by examiner

*Primary Examiner* — Reginald L Alexander
(74) *Attorney, Agent, or Firm* — Lowe Graham Jones PLLC

(57) ABSTRACT

An egg separator includes a bowl sized to accommodate at least one egg. The bowl includes sidewalls extending upward in a vertical direction from a lower portion on the bowl. In some versions, a clip is provided to attach the egg separator to a mixing bowl or measuring cup.

8 Claims, 3 Drawing Sheets

EGG SEPARATOR

PRIORITY CLAIM

This application claims the benefit of provisional application Ser. No. 61/416,423 filed Nov. 23, 2010, the contents of which are incorporated by reference.

FIELD OF THE INVENTION

This invention relates generally to devices for separating egg whites from egg yolks.

BACKGROUND OF THE INVENTION

Separating egg whites from yolks can be a difficult process. In many cases, cooks use the egg shells to facilitate separation by cracking the egg and attempting to retain the yolk within one of the two halves of the shells. From the outset, this can lead to disaster if the shell does not break evenly or forms sharp edges that pierce the yolk. In the course of passing the yolk from one shell half to the other, the yolk may break or may slip out of the shell and become mixed with the egg whites. This and other methods for attempting to separate egg whites from yolks are inefficient and often prone to failure.

At least one prior art device includes a main bowl with a handle in which the main bowl has horizontal slits to allow the egg whites to pass through the slits and out of the main bowl. In such a prior art device, the nature of the slits may puncture the egg yolk, preventing the separation. In addition, the placement of the horizontal slits at a level just below the rim of the bowl prevents complete separation of the white and yolk because some yolk may still pool beneath and around the egg yolk. The horizontal slits also cause the device to drain slowly because they do not allow the egg whites to pull away from the yolk effectively. This often results in the user shaking the device, making the operation more difficult and increasing the likelihood of breaking the yolk in the process.

Conventional wisdom has been that an egg yolk separation device requires a solid structure beneath the entirety of the egg yolk. The inventor has found, however, that the yolk may still be supported sufficiently with vertical slots that are provided in a region beneath the egg yolk itself and extending upward along the sides of the bowl.

SUMMARY OF THE INVENTION

An egg separator includes a bowl sized to accommodate at least one egg. The bowl includes sidewalls extending upward, with at least one slit extending in a vertical direction. Most preferably, the slit begins at a lowest portion of the bowl and runs in a vertical direction toward the rim of the bowl.

In on version of the invention, three slits are provided, spaced evenly about the perimeter of the bowl.

In accordance with some versions of the invention, a clip or retaining mechanism is provided to secure the egg separator to a rim of a mixing bowl. Consequently, egg separator may be attached in a fixed position such that the bowl of the egg separator may be extended over the mixing bowl, allowing a user to crack an egg and pour it into the egg separator.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
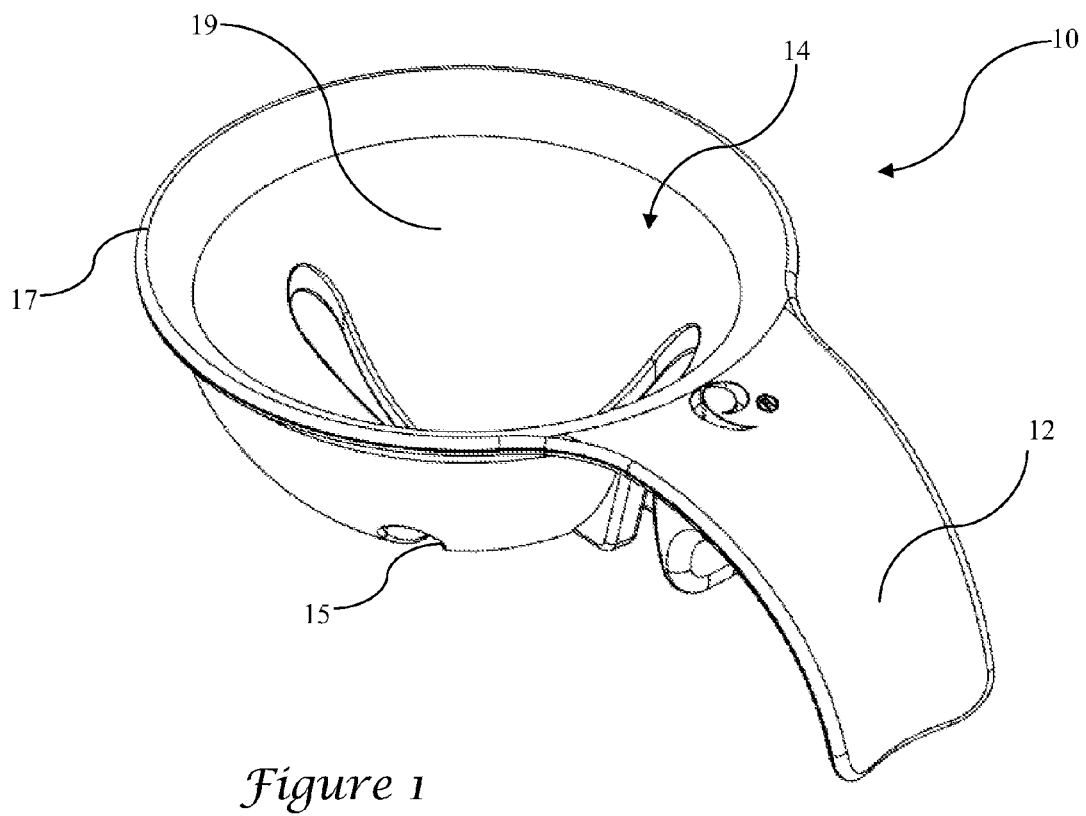
FIG. 1 is a perspective view of a preferred egg separator.
Figure 2:
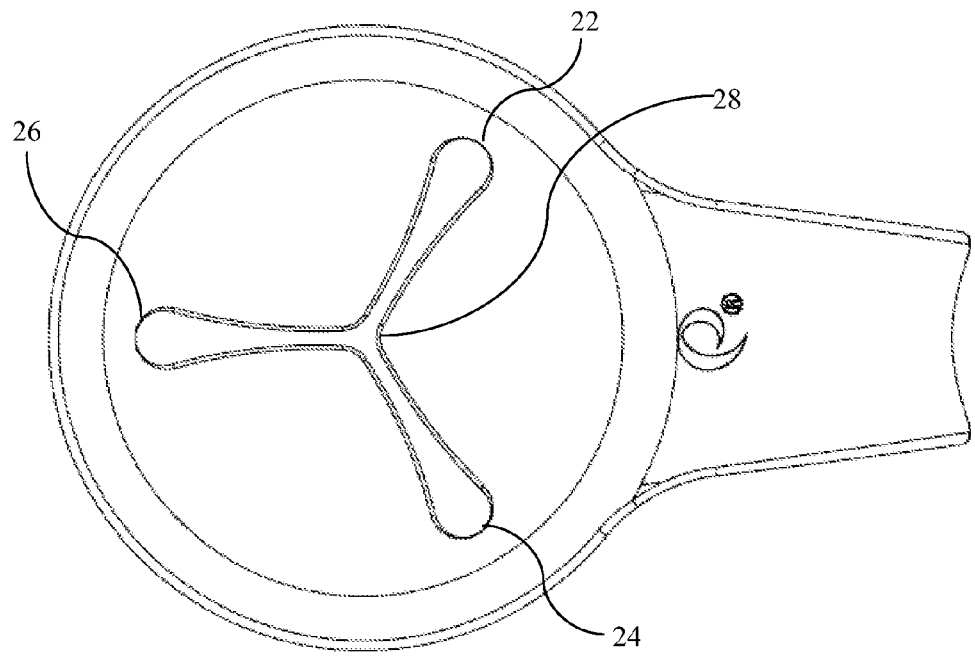
FIG. 2 is a top view of the egg separator of FIG. 1.

An exemplary egg separator 10 in accordance with the invention as illustrated in FIG. 1 includes a bowl 14 having a floor or base 15, a rim 17, and sidewalls 19 extending outwardly and upwardly in a curved fashion from the base to the rim. In other versions the sidewalls may be more squared off or angled, though in the preferred version they are rounded as illustrated. The bowl is sized and shaped to receive at least one egg that has been separated from its shell. Though the separator is preferably sized to accommodate a single egg, in some versions it may be sized sufficiently to receive more than one or several eggs. The bowl is preferably generally concave in shape and may be hemispherical, more flattened, or cylindrical as desired. Although the term "bowl" is used to refer to the structure for receiving the egg, it should be understood that in various version of the invention the bowl may be any size or shape so long as it is configured to hold one or more eggs.

In some versions of the invention, the bowl includes a handle 12 extending laterally away from the bowl. The handle preferably extends from an upper rim of the bowl, but in other versions it may extend laterally from an intermediate location along a sidewall forming the bowl. As illustrated in the figures, the handle is curved downward in a direction from the rim toward the base as it proceeds radially away from the bowl. The general downward curvature makes the egg separator easier to hold in a hand of the user in the process of separating an egg from a yolk.

Figure 3:
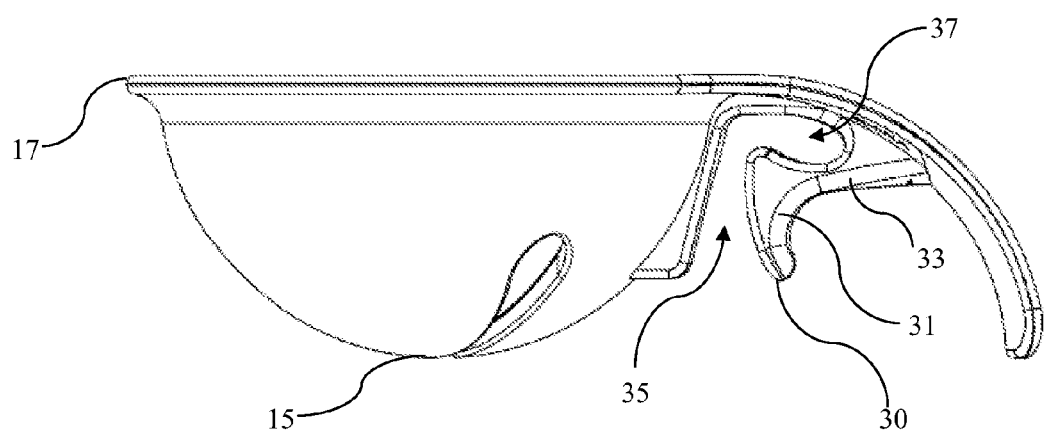
FIG. 3 is a front view of the egg separator of FIG. 1.
Figure 4:
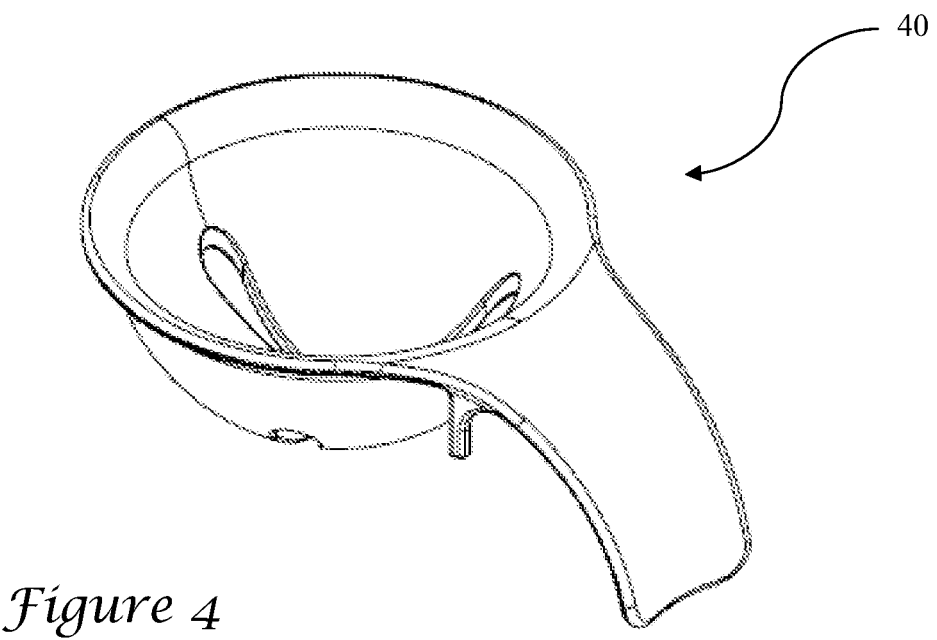
FIG. 4 is a perspective view of an alternate version of a preferred egg separator.

In addition, as best seen in FIG. 3, the handle preferably curves downward and away from the bowl such that it terminates at a position in which the distal end of the handle is at a vertical distance below the rim that is substantially equal to the vertical distance of the base below the rim. Accordingly, the handle allows the egg separator to rest in a stable manner on a horizontal surface because the handle and bottom of the base are both in contact with the surface.

The bowl includes one or more slots arranged along the sidewalls of the bowl. In a preferred version, at least two slots are positioned in a substantially vertical orientation from the base of the bowl toward the rim. In this sense, "substantially vertical" means that the slots define a longitudinal path from a position on the bowl that is relatively closer to the bowl to a position higher on the bowl that is relatively closer to the rim.

In the illustrated example of the invention, three slots 22, 24, 26 are provided. Each of the three slots meets at the center of the base of the bowl 28 in the preferred example, substantially at the lowest portion of the bowl. The slots are thereby interconnected in this version of the invention, essentially forming a continuous opening in the material forming the bowl, allowing substances inside the bowl to pass readily through the sidewalls of the bowl.

As further illustrated in the exemplary version of the invention, the three slots are oriented substantially equidistant about the perimeter of the bowl and radially positioned at equal angles from one another, each meeting at an origin positioned in the center, bottom portion of the base of the bowl. Each of the slots extends upwardly along the sidewalls of the bowl for an equal distance, rising to a level half way or greater from the base to the rim.

In yet other versions of the invention, only two slots are provided. In other versions of the invention, four or more slots are provided. Particularly for version of the invention having four or more slots, one or more of the slots may optionally terminate at a level higher than one or more of the other slots.

As illustrated, the slots preferably are wider at their upper end than at their lower end near the base of the bowl. Thus, in one version, the slots have a width from one edge to the opposite edge of about 4 mm at their highest point, narrowing to approximately 1 mm in width where the slots meet at the base. This narrowing helps to facilitate the passage of egg whites through the bowl along the upper portions of the sidewalls while still providing ample support for the egg yolk along the base of the bowl. The vertical slots further allow egg whites to pass through the bowl along the entire portion of the bowl from the base toward the termination of the slots adjacent the rim, preventing portions of the egg whites from pooling beneath or around the egg yolk within the bowl.

In a preferred version of the invention, the handle includes a clip 30. The clip includes a knob 31 adjacent attached to an arm 33 that is somewhat constricted to allow it to flex. A first channel 35 is defined between the knob and a vertical outer portion of the sidewall, sized and configure to receive an upper portion of a sidewall of a mixing bowl snugly within the first channel. A second channel 37 is provided between an upper portion of the arm 33 and a lower surface of the handle adjacent the rim 17 of the bowl. The first and second channels are continuous with one another, such that the second channel is configured to receive a rim of a mixing bowl while the first channel snugly receives a portion of a vertical sidewall of a mixing bowl. When in place, an egg can be poured into the egg separator at the rim of the mixing bowl, allowing the egg whites to drain into the mixing bowl while the egg yolk is retained within the egg separator. The flexure of the clip 30 at the arm 33 allows the mixing bowl to be removed from the clip in order to dump the egg yolk from the egg separator as desired.

Figure 5:
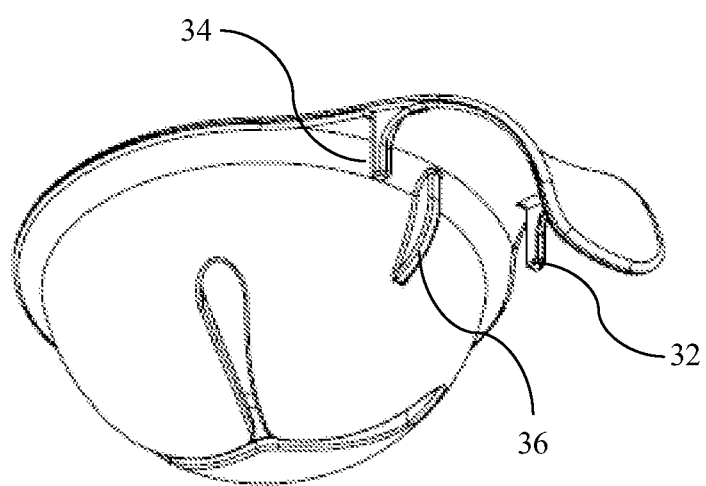
FIG. 5 is a bottom perspective view of the egg separator of FIG. 4.

In some versions of the invention, the handle includes one or more legs 32, 34 extending downward from a lower surface of the handle. This version is best seen in FIG. 5, and provides an alternate means for attaching the egg separator to the side of a mixing bowl. Most preferably, the legs are positioned at a location spaced apart from the sidewalls of the bowl, generally at a distance sufficient to receive the sidewalls of a typical mixing bowl between the sidewalls of the egg separator bowl and the legs projecting from the handle.

The legs project vertically downward from the handle, in which an inner face of the legs has a surface that is substantially parallel with a vertical axis extending through the center of the bowl. The positioning and spacing of the legs allows a rim of a mixing bowl to be frictionally retained within the space between the legs of the egg separator.

In some versions, the egg separator further includes a central fin 36 positioned along an outer portion of the sidewalls of the bowl. As illustrated, the central fin is positioned beneath the handle and oriented between the two legs 32, 34 extending from the handle.

As described above, the egg separator may be placed over the rim of a measuring cup, pan, or mixing bowl, trapping the rim of the measuring cup, pan, or mixing bowl between the outer sidewalls or central fin of the egg separator and the inner face of the clip or legs extending from the handle. The clip or legs thereby hold the egg separator in place at the rim of the cup, pan, or mixing bowl so that the user can use two hands to crack an egg and pour the white and yolk into the egg separator. The egg whites thereafter pass through the slots and into the pan or mixing bowl, retaining the egg yolk within the egg separator so that it can be used in another preparation as desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An egg separator, comprising:
    a bowl having a base, a rim, and sidewalls extending upward from the base to the rim;
    a slot formed in the sidewall and providing a passageway to allow fluids to pass through the bowl, the slot extending from a first point to a second point, the first point being at the base of the bowl and the second point being on the sidewall;
    a handle secured to the bowl, the handle extending laterally away from the rim and terminating in a handle distal end;
    a knob projecting inward from the handle toward an outer surface of the bowl, the knob forming a channel between the knob and the outer surface of the bowl for receiving a portion of a mixing bowl; and
    a flexible arm securing the knob to the handle.

2. The egg separator of claim 1, wherein the slot extends longitudinally from the first point to the second point.

3. The egg separator of claim 1, wherein the slot comprises a plurality of slots, each of the plurality of slots extending from the base of the bowl upward toward the rim of the bowl.

4. The egg separator of claim 3, wherein each of the plurality of slots are connected to one another at the base of the bowl.

5. The egg separator of claim 4, wherein each of the plurality of slots are radially spaced equally apart from one another.

6. The egg separator of claim 4, wherein each of the slots has a first width adjacent the base and a second width at an opposite end of the slot, the first width being smaller than the second width.

7. The egg separator of claim 1, wherein the handle curves in a direction from the rim downward toward the base as it extends laterally away from the rim, the handle distal end terminating at a distance below the rim that is substantially the same as a height of the base below the rim.

8. The egg separator of claim 1, further comprising a means for mounting the egg separator to a rim of a mixing bowl.

* * * * *